United States Patent [19]
Largent

[11] Patent Number: 5,806,654
[45] Date of Patent: Sep. 15, 1998

[54] ROTATING SINGULATOR

[76] Inventor: Thomas R. Largent, 7931 Bass Pond Rd., Millville, Calif. 96062

[21] Appl. No.: 810,808

[22] Filed: Mar. 5, 1997

[51] Int. Cl.⁶ .......................... B65G 17/32; B65G 44/18; B65G 47/12
[52] U.S. Cl. .......................... 198/392; 198/393; 198/443; 198/397.04
[58] Field of Search ..................................... 198/392, 393, 198/443, 397.04, 397.05

[56] References Cited

U.S. PATENT DOCUMENTS

| | | | |
|---|---|---|---|
| 1,911,106 | 5/1933 | Camerota | 198/443 |
| 3,063,543 | 11/1962 | Schneider | 198/397.04 |
| 3,627,105 | 12/1971 | Prodzenski | 198/393 |
| 5,178,256 | 1/1993 | Anderson et al. | 198/392 |
| 5,423,412 | 6/1995 | Ohta et al. | 198/443 |
| 5,474,493 | 12/1995 | Tolbert | 198/392 |
| 5,484,048 | 1/1996 | Ohta et al. | 198/397 |

FOREIGN PATENT DOCUMENTS

484142  3/1976  U.S.S.R. ................................ 198/443

*Primary Examiner*—Karen M. Young
*Assistant Examiner*—Thuy V. Tran
*Attorney, Agent, or Firm*—Fliesler, Dubb, Meyer & Lovejoy LLP

[57] ABSTRACT

A singulator for transporting and separating tires is provided having a disk with inverted cone shaped front surface at an angle $\alpha$, a center hub and a plurality of flights. Each extends from a side of the hub to an edge of the disk for dividing the disk's front surface into sections where each section is defined by two adjacent flights namely a leading flight and a trailing flight. A first element is connected to the disk for rotating the disk at a rearward angle $\Delta$ with reference to a horizontal ground plane such the disk's front surface is at an angle $\epsilon$ where $\epsilon=\Delta-\alpha$. A hopper is mounted at a downward angle $\gamma$ and is semicircular in shape and has approximately the same radius as a radius of the disk. A chute is provided in the hopper for transporting tires in the hopper to a bottom area of the hopper such that a tire in the bottom area will stand upon its treads. The surface angle $\epsilon$ and the hopper angle $\gamma$ coact to facilitate the transfer of tires in the hopper bottom area into sections of the disk as each section interfaces with the hopper. A side wall is located perpendicular to a downward rotating edge of the disk and includes an exit port for providing egress of tires from a section of the disk via an exit ramp to an exit slide and then to an exit conveyor.

18 Claims, 5 Drawing Sheets

ROTATING SINGULATOR

BACKGROUND OF THE INVENTION

1. Field of the Invention

The present invention generally relates to an apparatus for transporting and separating used tires and the like. More particularly, the present invention relates to a rotating singulator suitable for receiving, separating and transporting used tire or waste tires or the like.

2. Description of the Related Art

For a number of years, industries, such as the cement industry, has been using old or waste tires as fuel. Generally, the tires would be transported to the user's site and stored in bins. Present separation and transporting systems receives tires from the user's tire bin and provides an inclined linear conveyer, which includes a plurality of pick mechanisms for engaging the tires, for raising tires engaged by the pick mechanisms to an elevated exit port. The angle of incline of the linear conveyer must be at such so as to not cause a tire supported by a pick mechanism from fall back into the bin while allowing tires not engaged by the pick mechanism, such as a tire laying on top of a tire engaged by a pick mechanism, to either fall back into the user's tire bin or to be shunted to a slide for return to the user's tire bin.

As the tires reach the top of the conveyer, the tires reach a translation point at which the tires fall forward, by gravity, onto an exit conveyer for further transportation to the furnace. This change in orientation of the tires at the translation point is a limiting feature of how many tires can be delivered to the exit point per minute. If the speed of the conveyer is to fast, the tires at the translation point will fall backwards into the users bin rather than falling forward onto the receiving conveyer. Such linear conveyer systems presently deliver between 6 and 6.5 tires per minute.

The conveyer requires high maintenance in that the conveyor has a large number of moving parts that are exposed to wear and tear due to the dirt and such carried on the tires.

SUMMARY OF THE INVENTION

It is an object of the present invention to provide a transportation and separation system that can provide an increase in the number of separated tires at the exit port of the system.

It is another object of the present invention to provide a transportation and separation system that requires less maintenance than does a transportation and separation system that employs an inclined linear conveyer.

Briefly the invention is a transportation and separation system, called a singulator, that employs a rotating disk instead of an inclined linear conveyer. The singulator comprises a disk having an inverted cone shaped front surface and a center hub from which flights extend therefrom perpendicular to the surface of the disk to form sections, a shaft for connecting the disk to a motor, a hopper, a base for supporting the motor and the disk structure and side walls with one side wall having an exit port. The motor disk structure is mounted upon the base such that as the disk is rotated the disk sections will sequentially interface with the hopper. The hopper delivers tires such that the tires will be placed flat upon the disk surface in a section presently interfacing with the hopper and the weight of the tire will be borne by the sidewall of the tire. As the disc is rotated an upwardly moving first flight of the section will cause the tires to be lifted and rotated within the singulator.

As a tire is raised, the tire will have a tendency to transfer the weight of the tire from the sidewall to the treads of the tire and to roll toward the center of the disk due to the cone shape of the disk. As a section makes the translation from an upward to a downward movement, the tire in the section have a tendency to transfer the tire's weight from the treads to the sidewall of the tire and to slide towards the center of the disc due to the cone shape of the disk. As the section moves downward during the cycle of rotation of the disk, the tire in the section will have a tendency to shift the tire's weight from the sidewall of the tire to the treads of the tire and to roll outwardly, due to gravity. along a downwardly moving second flight of the section. The wall having the exit port is located perpendicular to the downwardly rotating edge of the disk such that the tire in a section will roll out of the section and through the exit port onto an exit conveyor.

An advantage of the singulator is that the singulator can reliably deliver 12–15 tires per minute to the exit port in the side wall.

BRIEF DESCRIPTION OF THE DRAWINGS

The invention will be described with respect to the particular embodiments thereof and references will be made to the drawings, in which.

DETAILED DESCRIPTION OF THE INVENTION

Figure 1:
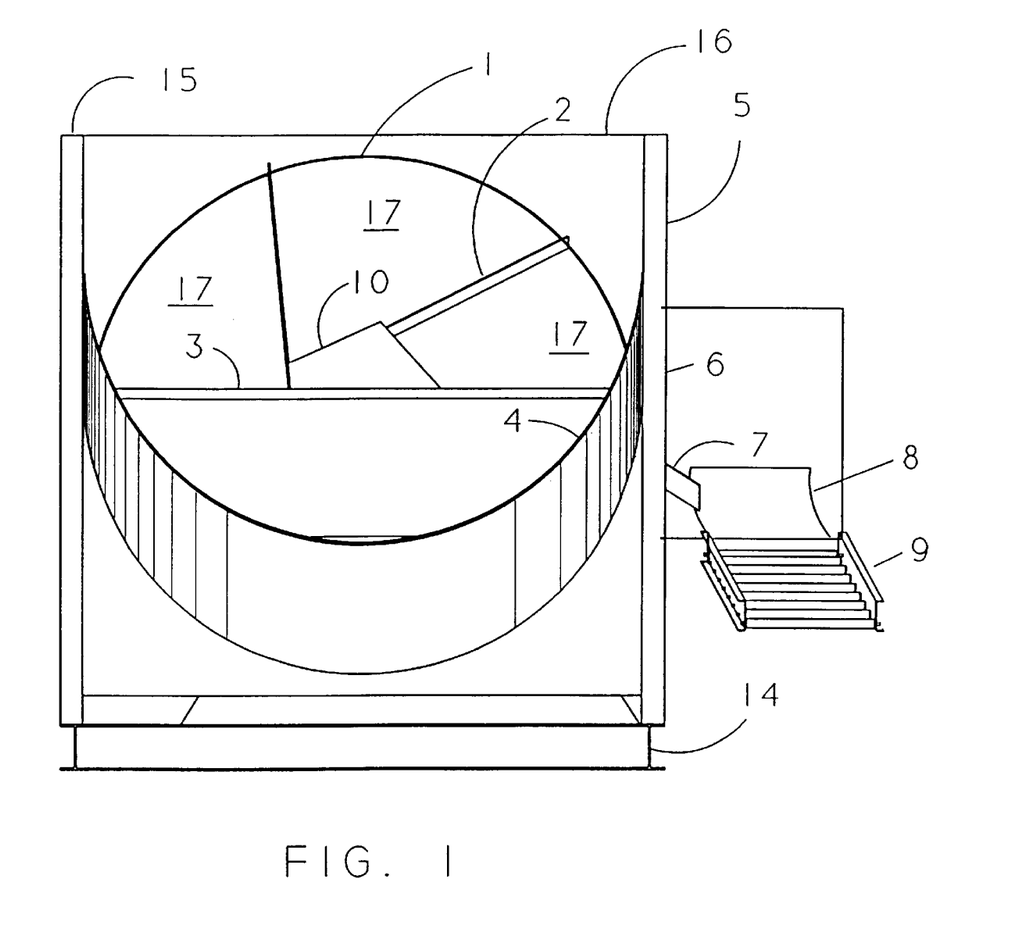
FIG. 1 is a front view of the singulator of the invention.
Figure 2:
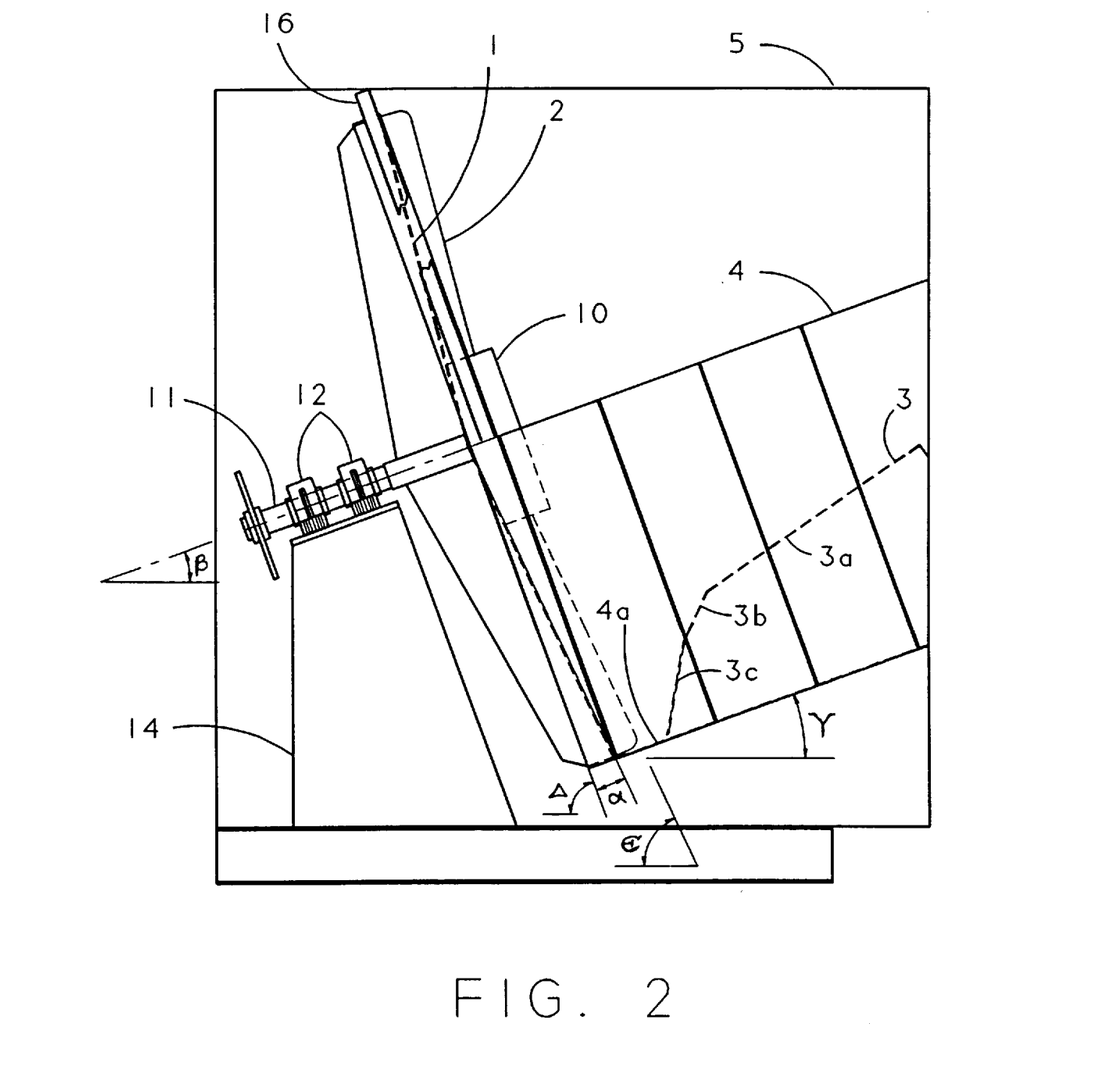
FIG. 2 is a left side view of the singulator showing the relative positions of the disk and hopper of the invention.

FIGS. 1 and 2 show the major components of the singulator of the invention. Disk 1 has a inverted cone shaped surface emanating from the center of disk 1 at an angle $\alpha$ of 10 degrees and a center hub 10. Hub 10 is shown to be a pentagon for defining five sections 17 however hub 10 can have as many sides as desired to form as many sections 17 as desired. A flight 2 extends along one side of hub 10 to the outer edge of disk 1, is located perpendicular to the surface of the disk 1 and is attached to one side of the hub 10 and to the surface of the disk 1. The width of a flight 2 is designed to be at least ¾ the maximum tread width of a tire to be transported and separated. Five flights 2 are shown such that five sections 17 are formed. A section 17 is defined as the surface area of disk 1 between two adjacent flights. As the disk is rotated, the flight that would pass a fixed reference point outside the disk 1 is defined as the leading flight for a section and the other flight associated with that section is defined as the trailing flight. Therefore a given flight will be both the trailing flight of a section first passing the fixed reference point and the leading flight of the next section to pass the fixed reference point as the disc 1 is rotated leading flight for one section and the trailing flight for another section. The disk should have a radius sufficient that as many desired maximum size tires can lie on the disc surface of a section without the tires overlapping each other.

A shaft 11 is attached at a right angle to the hub 10 of the disk 1. The shaft 11 is mounted upon a base 14 at an upward angle β of 20 degrees from the horizontal ground plane by base 14 through bearing assemblies 12 such that the disc 1 is tilted rearward at an angle Δ of 70 degrees with reference to the horizontal ground plane. The angle α of 5 degree for the inverted cone shape of the front surface of disc 1 subtracts from angle Δ of 70 degrees resulting in the inverted cone shape surface of disk 1 to be tilted rearwardly at an angle ε of 60 degrees from the horizontal ground plane.

The angle of the surface of the disk with reference to the horizontal level of ground is ((90−β)−α) where β should be less than 30 degrees and the angle ε should be between 60 and 80 degrees. The angle ε should be steep enough such that (1) any tire resting upon another tire in a section will fall back into the hopper as the underlying tire is raise and rotated within the section of the disk and (2) shallow enough such that tire's weight on the tire's sidewall when first placed onto the disk surface of a section of the disk will be sufficient to maintain the tire in the section. The cone angle α should be large enough to cause a tire to move towards the center of the disk as a trailing flight moves the tire upwardly and shallow enough not to impede the outward motion of the tire along the leading flight as the tire is lowered by the leading flight to the exit port.

Referring to FIGS. 1 and 2, a semi circular hopper 4 is attached to side walls 5 and 15 at a downward angle γ of 20 degrees from the horizontal ground plane thereby forming an angle between the front surface of disk 1 and the inside bottom area 4a of the hopper 4 of 95 degrees. The semicircular hopper 4 has approximately the same radius as disk 1 and is located in close proximity to the front surface of the disk such that the inner curve bottom area 4a of hopper 4 matches the outer curvature of disk 1 thereby preventing tires in a section 17 of disk 1 from falling off the front surface of disk 1. Hopper 4 has an inner chute 3 for directing tires into a bottom area 4a of hopper 4 such that the tires will be standing of the tires tread in bottom area 4a. A tire so located in bottom area 4a will have a tendency to fall by gravity onto the surface of a section 17 of disc 1 then interfacing with hopper 4. Chute 3 is made up of three areas 3a, 3b and 3c where the areas are at increasing downward angle from the rear of hopper 4 to the front of hopper 4 which interfaces with the front surface of disk 1. Tires lying on the tires sidewall in area 3a will side down area 3a and over translation areas 3b and 3c such that the tires will be standing upon the tires treads in area bottom 4a of the hopper 4.

Figure 4:
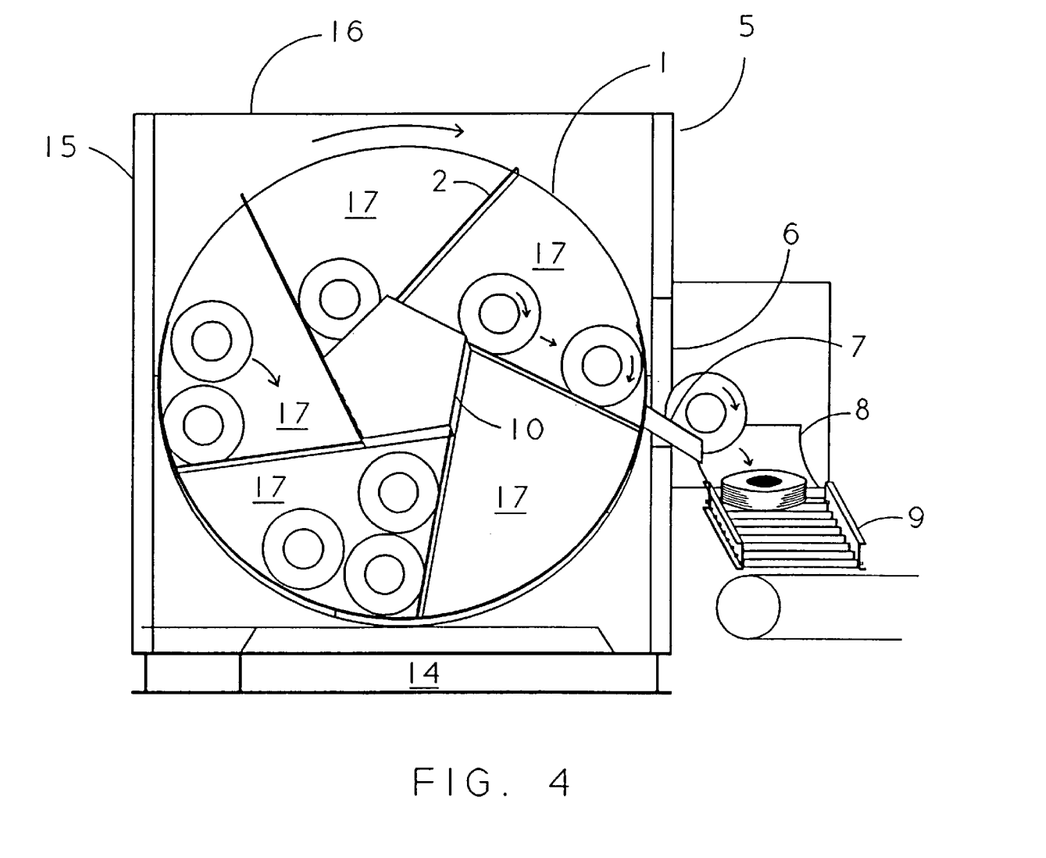
FIG. 4 is a front view of the singulator illustrating tires in sections, as defined by the flights, being transported up and around to the exit port, the exit slide and the exit conveyor.
Figure 5:
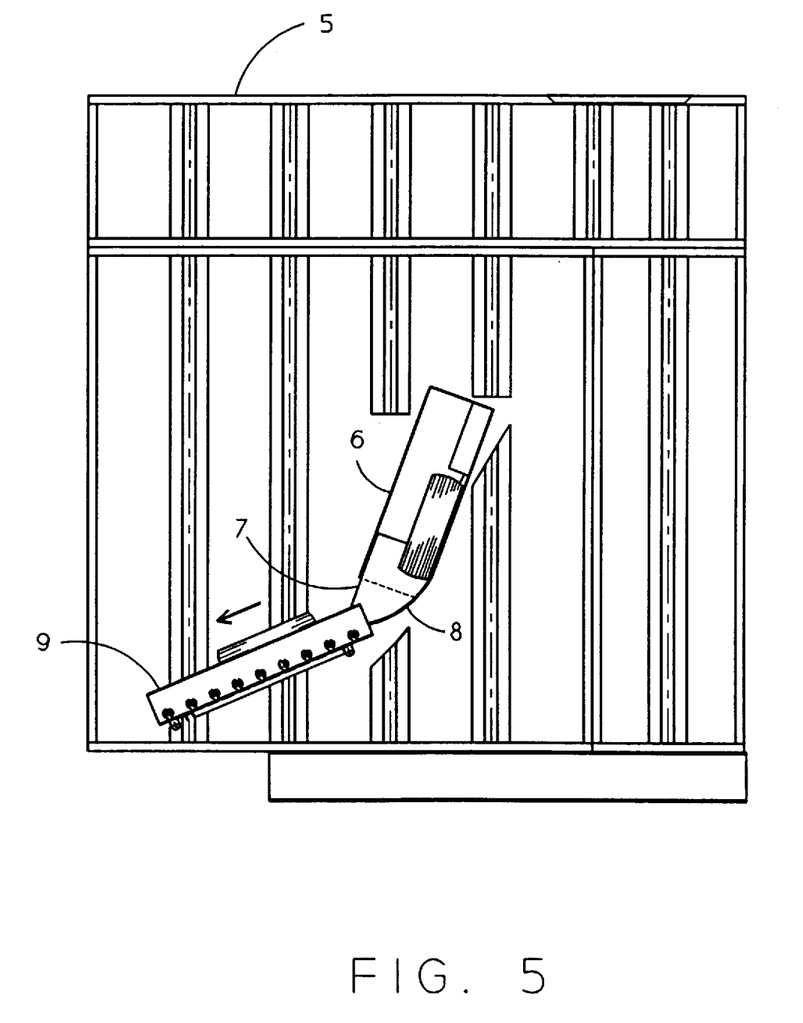
FIG. 5 is a right side view of the singulator showing the relative positions of the edge of the disk and the exit port in the right side wall, the exit slide and the exit conveyor.

Referring to FIGS. 1, 4 and 5, side walls 5 and 15 and upper back wall 16 enclose disk 1 to prevent tires from falling off the disk 1. Side wall 5 includes an exit port 6 cut into the wall 5 along the edge of disc 1 at a downward angle of (90−β) degrees from the vertical (70 degrees in the embodiment shown) and sized to allow one at a time maximum size tires to pass from a section 17 on disc 1 through exit port 6 and onto exit ramp 7 to exit slide 8. Exit ramp 7 is connected at a downward angle away from the side of disc 1 thereby providing a downwardly orientated path upon which a tire in section 17 at exit port 6 my roll upon onto exit slide 8. Exit slide 8 is scooped shaped such that tires passing through exit port 6 on exit ramp 7 will be directed by exit slide 8 onto exit conveyor 9.

Figure 3:
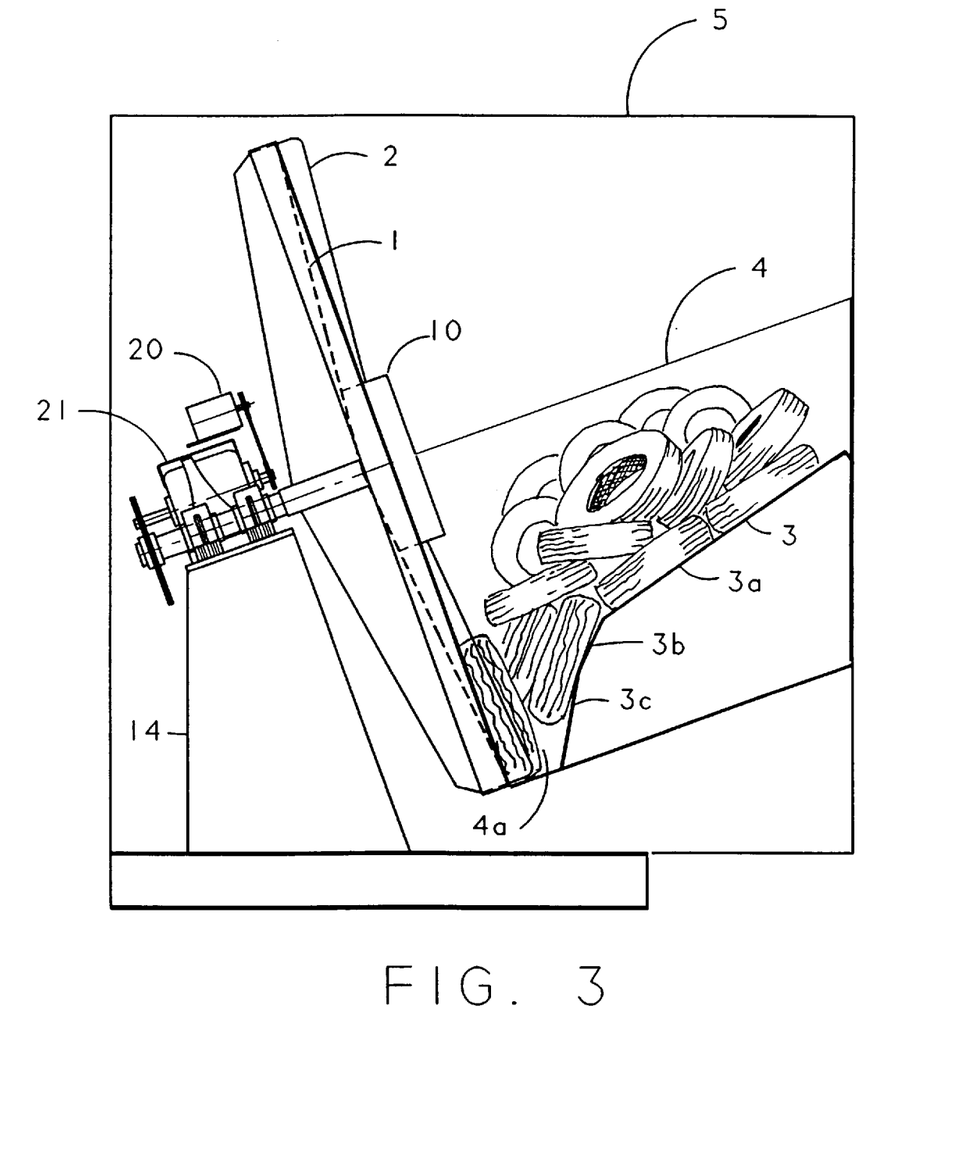
FIG. 3 is a left side view of the singulator illustrating the delivery of tires in the hopper to the sections of the disk.

Referring to FIGS. 3 and 5, a 3 horsepower motor 20 operating at a speed of 1740 rpms (revolutions per minute). The motor 20 speed is geared down by gear box 21 such that the rotational disk speed will be in the range 2.5 to 3.3 rpms. Testing has shown that the singulator will operate efficiently and reliably when the disk 1 is rotated within the range of 2.5 to 3.3 rpms for the values of the angles α, β, γ, Δ and ε as set forth above. The rotational speed of the disc should be selected such that rotational forces on the tire in the section will not cause a properly located tire to fall back into the hopper 4 and sufficient time to allow all the tires in a section 17 of the disk 1 to exit from the section 17 through the exit port 6.

Referring to FIGS. 3, 4, and 5, the operation of the singulator will be described as to a single tire. A tire loaded into hopper 4 will slide down chute 3 into bottom area 4a such the tire will be on standing on the tire's treads. The force of gravity and the pressure exerted by other tires in the hopper 4 cause the tire to fall onto the surface of a section 17 of disc 1 with the tire's weight resting upon the tires sidewall. The trailing flight 2 of a section 17 will engage the tire on the surface of the disk 1 thereby moving the tire upward as disk 1 is rotated.

As the tire is raised the tire will transfer the tire's weight from the tire's sidewall onto the tire's treads resting upon the trailing flight 2 and will move towards the center of the disk. As the tire pass from a raising movement to a downward movement the weight of the tire is transferred from the trailing flight to the leading flight. As downward slope of leading flight is increased as the disc 1 is rotated, the tire will roll along the leading flight 2 towards the edge of disk 1. The tire will roll onto exit ramp 7, through exit port 6 to exit slide 8. Once upon exit slide 8 the tire will slide down to and upon exit conveyor 9.

In the described embodiment, a motor speed of 2.8 rpms will cause 14 section 17 to pass by exit port 6. Each section 17 is shown to be able to transport up to three tires and therefore one might expect that the system should provide reliably up to 42 tires per minute. In practice, the number of tires that is place in a section can vary from none to three and testing has shown that the system will reliably provide 12 to 14 tires per minute. In some instances, a tire may not exit from a section as the section pass by the exit port 6 but this will cause no harm for the tire will simply be rotated once again to exit port 6.

While the invention has been particularly shown and described with references to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A singulator for transporting and separating tires comprising:
    a disk having
        an inverted cone shaped front surface extending from the center of the disk at an angle α,
        a center hub having a plurality of sides and
        a plurality of flights where each flight of said plurality of flights extends from of sides of said plurality of sides of said hub to an edge of said disk, said each flight of said plurality of flights being perpendicular to said surface of said disk for dividing said disk front surface into a plurality of sections where each section of said plurality of sections is defined two adjacent flights of said plurality of flights namely a leading flight and a trailing flight;
    a first means connected to said disk for rotating said disk at a rearward angle Δ such that said disk will have a front surface angle ε where ε=Δ−α.

2. The singulator of claim 1 wherein said first means rotates said disk at a rotational speed of 2.5 and 3.3 revolutions per minute.

3. The singulator of claim 1 wherein said plurality of flights is equal to five flights defining five sections.

4. The singulator of claim 1 wherein said angle $\alpha$ is 5 degrees and said angle $\Delta$ is 70 degrees.

5. The singulator of claim 1 further comprising:
   a hopper mounted within said singulator at a downward angle $\gamma$, said hopper being semicircular in shape and having approximately the same radius as a radius of said disk.

6. The singulator of claim 5 wherein said hopper comprises:
   a chute in said hopper for transporting tires in said hopper to a bottom area of said hopper such that a tire in said bottom area will be standing upon treads of said tire and whereby said surface angle $\epsilon$ and said hopper angle $\gamma$ coact to facilitate the transfer of said tires in said hopper bottom area into said sections of said disk as each said section of said disk interfaces with said hopper.

7. The singulator of claim 5 wherein said hopper angle $\beta$ is 20 degrees.

8. The singulator of claim 1 further comprising:
   a side wall along a downward rotating edge of said disk;
   an exit port in said wall for providing egress of or tires from a section of said disk.

9. The singulator of claim 8 further comprising:
   an exit ramp mounted in the bottom of said exit port for providing a path of egress for said tires passing through said exit port.

10. The singulator of claim 8 further comprising:
    an exit slide for receiving each tire passing through said exit port and directing said received tire to a exit conveyor.

11. The singulator of claim 1 further comprising:
    side walls and an upper rear wall for preventing said tires from falling out of said singulator while being transported in said sections of said disk.

12. The singulator of claim 1 where the angle $\epsilon$ is between 60 and 80 degrees.

13. A singulator for transporting and separating tires comprising:
    a disk having
        an inverted cone shaped front surface extending from the center of the disk at an angle $\alpha$,
        a center hub having a plurality of sides and
        a plurality of flights where each flight of said plurality of flights extends from a side of said plurality of sides of said hub to an edge of said disk and is perpendicular to said surface of said disk, said plurality of flights dividing said disk front surface into a plurality of sections where each section of said plurality of sections is defined two adjacent flights of said plurality of flights namely a leading flight and a trailing flight;
    a first means connected to said disk for rotating said disk at a rearward angle $\Delta$ such that said disk will have a front surface angle $\epsilon$ where $\epsilon=\Delta-\alpha$;
    a hopper mounted within said singulator at a downward angle $\gamma$, said hopper being semicircular in shape and having approximately the same radius as a radius of said disk, and;
    a chute in said hopper for transporting tires in said hopper to a bottom area of said hopper such a tire in said bottom area will be standing upon treads of said tire and where said surface angle $\epsilon$ and said hopper angle $\gamma$ coact to facilitate the transfer of said tires in said hopper bottom area into said sections of said disk as each said section of said disk interfaces with said hopper;
    a side wall along a downward rotating edge of said disk;
    an exit port in said side wall for providing egress of tires from a section of said disk;
    an exit ramp mounted in the bottom of said exit port for providing a path of egress for said tires passing through said exit port; and
    an exit slide for receiving each tire passing through said exit port and directing said received tire to a exit conveyor.

14. The singulator of claim 13 wherein said first means rotates said disk at a rotational speed of 2.5 and 3.3 revolutions per minute.

15. The singulator of claim 13 wherein said plurality of flights is equal to five flights defining five sections.

16. The singulator of claim 13 wherein said angle $\alpha$ is 5 degrees and said angle $\Delta$ is 70 degrees.

17. The singulator of claim 13 wherein said hopper angle $\beta$ is 20 degrees.

18. The singulator of claim 13 where the angle $\epsilon$ is between 60 and 80 degrees.

* * * * *

UNITED STATES PATENT AND TRADEMARK OFFICE
CERTIFICATE OF CORRECTION

PATENT NO.   : 5,806,654                              Page 1 of 2
DATED        : September 15, 1998
INVENTOR(S)  : Thomas R. Largent It is certified that error appears in the above-indentified patent and that said Letters Patent is hereby corrected as shown below:

Abstract, line 9,   after "such" insert --that--; line 12, "as a" should be --as the--.
Column 1, line 16,  "receives" should be --receive--.
Column 1, line 22,  "fall back" should be --falling back--.
Column 1, line 33,  "to fast" should be --too fast--.
Column 2, line 6,   "have" should be --has--.
Column 2, line 12,  after "gravity" the period (.) should be a comma (,).
Column 3, line 6,   "degree" should be --degrees--.
Column 3, line 16,  "raise" should be --raised--.
Column 3, line 18,  after "that" insert --the--.
Column 3, line 38,  "of the tires" should be --on the tire's--.
Column 3, line 45,  "tires" should be --tires'--; "side" should be --slide--.
Column 3, line 47,  "tires" should be --tires'--.
Column 3, line 59,  "my" should be --may--; delete "upon".
Column 3, line 60,  "scooped" should be --scoop--.
Column 4, line 12,  after "such" insert --that--; after "be" delete "on".
Column 4, line 15,  "tires" should be --tire's--.
Column 4, line 22,  "pass" should be --passes--.
Column 4, line 35,  "is place" should be --are placed--.
Column 4, line 38,  "pass" should be --passes--.

UNITED STATES PATENT AND TRADEMARK OFFICE
CERTIFICATE OF CORRECTION

PATENT NO. : 5,806,654
DATED : September 15, 1998
INVENTOR(S) : Thomas R. Largent Page 2 of 2

It is certified that error appears in the above-indentified patent and that said Letters Patent is hereby corrected as shown below:

Column 4, line 57, "of sides" should be --a side--.
Column 4, line 62, "after "defined" insert --by--.
Column 5, line 35, "a exit" should be --an exit--.
Column 6, line 8, after "defined" insert --by--.
Column 6, line 20, after "such" insert --that--.
Column 6, line 33, "a exit" should be --an exit--.

Signed and Sealed this

Eighth Day of June, 1999

Attest:

Q. TODD DICKINSON

*Attesting Officer*            *Acting Commissioner of Patents and Trademarks*